(12) United States Patent
Rengarajan et al.

(10) Patent No.: US 9,558,528 B2
(45) Date of Patent: Jan. 31, 2017

(54) ADAPTIVE VIDEO DIRECT MEMORY ACCESS MODULE

(71) Applicant: Xilinx, Inc., San Jose, CA (US)

(72) Inventors: Alagar Rengarajan, Hyderabad (IN); Ravinder Sharma, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/668,184

(22) Filed: Mar. 25, 2015

(65) Prior Publication Data

US 2016/0284040 A1 Sep. 29, 2016

(51) Int. Cl.
- G06F 3/00 (2006.01)
- G06T 1/00 (2006.01)
- G06T 1/20 (2006.01)
- G06F 3/06 (2006.01)
- G06T 1/60 (2006.01)

(52) U.S. Cl.
CPC . *G06T 1/20* (2013.01); *G06F 3/06* (2013.01); *G06T 1/60* (2013.01); *G06F 2003/0691* (2013.01); *G06F 2003/0692* (2013.01)

(58) Field of Classification Search
None
See application file for complete search history.

(56) References Cited

U.S. PATENT DOCUMENTS

| | | | | |
|---|---|---|---|---|
| 5,754,801 A | * | 5/1998 | Lambrecht | G06F 13/124 345/520 |
| 5,809,278 A | * | 9/1998 | Watanabe | G06F 13/18 345/532 |
| 5,809,538 A | * | 9/1998 | Pollmann | G06F 13/18 345/520 |
| 6,952,684 B2 | * | 10/2005 | Toshikage | G03B 31/06 345/418 |
| 6,975,324 B1 | * | 12/2005 | Valmiki | G09G 5/06 345/547 |

(Continued)

FOREIGN PATENT DOCUMENTS

| WO | 9812646 | 3/1998 |
|---|---|---|
| WO | 2008008220 | 1/2008 |

OTHER PUBLICATIONS

Kumbhare, P. et al., "Designing High-Performance Video Systems in 7 Series FPGAs with the AXI Interconnect", Application Note: 7 Series FPGAs, XAPP741 (v1.3) Apr. 14, 2014, pp. 1-24, Xilinx, Inc., San Jose, CA USA.

(Continued)

*Primary Examiner* — Ashish K Thomas
(74) *Attorney, Agent, or Firm* — Keith Taboada; Joshua Hamberger

(57) ABSTRACT

A method, computing device, and non-transitory computer-readable medium for arbitrating data for channels in a video pipeline. The method includes determining arbitration weights for the channels. The method also includes determining which channels have arbitration weights above a threshold. The method further includes issuing data to the channels with arbitration weights above the threshold. The method also includes decrementing arbitration weights for channels for which data is issued. The method further includes repeating the determining, issuing, and decrementing until no channels have arbitration weights above the threshold.

20 Claims, 4 Drawing Sheets

(56) References Cited

U.S. PATENT DOCUMENTS

| | | | | |
|---|---|---|---|---|
| 7,054,964 B2* | 5/2006 | Chan | ............... | H04N 9/8042 |
| | | | | 345/530 |
| 7,873,757 B2* | 1/2011 | Kimelman | ............ | G06F 13/28 |
| | | | | 345/554 |
| 8,683,100 B1* | 3/2014 | Wang | ............... | H04L 5/0058 |
| | | | | 370/395.4 |
| 2006/0174050 A1* | 8/2006 | Chadha | ............ | G06F 13/4059 |
| | | | | 710/310 |
| 2011/0179240 A1 | 7/2011 | Sukonik et al. | | |
| 2012/0169745 A1* | 7/2012 | Carter | ............... | G06F 3/1431 |
| | | | | 345/520 |
| 2014/0125683 A1* | 5/2014 | Howard | ............ | G06T 1/20 |
| | | | | 345/505 |
| 2014/0204764 A1* | 7/2014 | Kumar | ............. | H04L 45/302 |
| | | | | 370/241 |
| 2014/0347331 A1* | 11/2014 | Amit | ............ | G09G 5/00 |
| | | | | 345/204 |

OTHER PUBLICATIONS

Zuber Patel et al., "Design and Implementation of Low Latency Weighted Round Robin (LL-WRR) Sheduling for High Speed Networks", vol. 6, No. 4, Aug. 31, 2014, pp. 59-71.

* cited by examiner

ADAPTIVE VIDEO DIRECT MEMORY ACCESS MODULE

TECHNICAL FIELD

Examples of the present disclosure generally relate to video processing and, in particular, to a multi-channel video direct memory access module.

BACKGROUND

Field-programmable gate arrays allow for fast prototyping and design of computing devices. Many pre-designed, modular computer processing modules exist for fast, powerful creation of such computing devices. It is typical to design computing devices with one or more video processing functions to provide video data for display to an end user.

Video processing functions generally involve a video pipeline including several video processing hardware modules that retrieve and process pixel data. Because the pixel data may be generated by different data creators, such pixel data is generally stored in a common memory buffer, such as a main system memory, for retrieval by the modules of the video pipeline. A module referred to as a video direct memory access (VDMA) module functions to retrieve pixel data from the memory buffer and transmit that pixel data to the modules of the pipeline for processing. Because video processing generally works according to particular timings, which are governed by video frame rate, resolution, and, potentially, other factors, the VDMA manages the timings with which video data is retrieved from the memory, as well as other aspects associated with interfacing with memory to obtain pixel data.

Many video pipelines include multiple video processing hardware modules, each of which interfaces, independently, with the system memory. Typically, in order to accommodate such situations, multiple VDMA modules are provided. Each VDMA module has independent access to the system memory and is thus able to access data in the system memory.

There are several issues with providing multiple independent VDMA modules as described above. One issue is that not each video processing hardware module has the same bandwidth characteristics, because not each video processing hardware module reads and processes the data at the same speed. Thus, the different VDMA modules are typically manually programmed based on the different bandwidth characteristics of the different hardware modules, as including over-sized VDMA modules would be wasteful. Another issue is that including multiple VDMA modules leads to multiple instances of infrastructure for coupling those VDMA modules to the other parts of the computing device being designed. A further issue is that because each VDMA module is programmed to accommodate the particular function being performed by the associated video processing hardware module, multiple VDMA modules means that programming must be performed multiple times.

As can be seen, what is needed in the art are improved techniques for accommodating various video processing applications.

SUMMARY

A method for arbitrating data for channels in a video pipeline is provided. The method includes determining arbitration weights for the channels. The method also includes determining which channels have arbitration weights above a threshold. The method further includes issuing data to the channels with arbitration weights above the threshold. The method also includes decrementing arbitration weights for channels for which data is issued. The method further includes repeating the determining, issuing, and decrementing until no channels have arbitration weights above the threshold.

A computing device for arbitrating data for channels in a video pipeline is provided. The computing device includes a video direct memory access (VDMA) module coupled to the channels. The VDMA module is configured to determine arbitration weights for the channels. The VDMA module is also configured to determine which channels have arbitration weights above a threshold. The VDMA module is further configured to issue data to the channels with arbitration weights above the threshold. The VDMA module is also configured to decrement arbitration weights for channels for which data is issued. The VDMA module is further configured to repeat the determining, issuing, and decrementing until no channels have arbitration weights above the threshold.

A non-transitory computer-readable medium storing instructions that, when executed by a processor, cause the processor to perform a method is also provided. The method includes determining arbitration weights for the channels. The method also includes determining which channels have arbitration weights above a threshold. The method further includes issuing data to the channels with arbitration weights above the threshold. The method also includes decrementing arbitration weights for channels for which data is issued. The method further includes repeating the determining, issuing, and decrementing until no channels have arbitration weights above the threshold.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting in scope.

To facilitate understanding, identical reference numerals have been used, where possible, to designate identical elements that are common to the figures. It is contemplated that elements of one example may be beneficially incorporated in other examples.

DETAILED DESCRIPTION

A multi-channel video direct memory access (VDMA) module with an arbiter, as well as techniques for automatically programming the VDMA module based on measured bandwidth characteristics of the video processing hardware modules of a video pipeline are provided. The multi-channel VDMA module reads pixel data from memory and streams out pixel data to an appropriate video processing hardware module according to an arbitration schedule that is set based on measured bandwidth characteristics between the VDMA and the memory as well as on the data consumption rate of the different video processing hardware module.

Figure 1A:
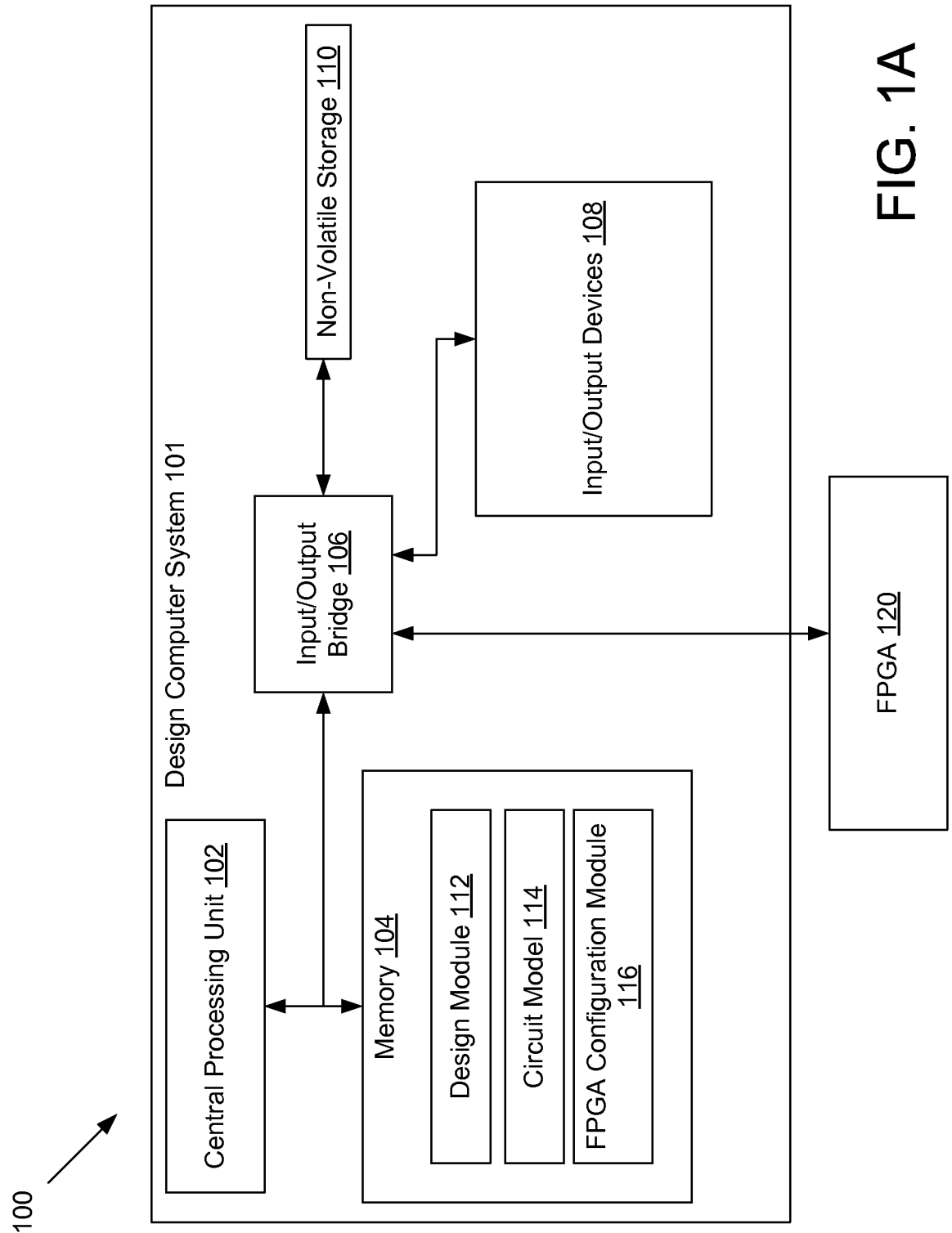
FIG. 1A is a block diagram illustrating a circuit design system for designing an electronic processing device that includes a video pipeline serviced by a multi-channel VDMA module.

FIG. 1A is a block diagram illustrating a circuit design system 100 for designing an electronic processing device that includes a video pipeline serviced by a multi-channel VDMA module. As shown, the circuit design system 100 includes a design computer system 101 and a field programmable gate array (FPGA) 120.

The design computer system 101 includes a central processing unit 102 (CPU), a memory 104, an input/output bridge 106, a non-volatile storage 110, and input/output devices 108. The CPU 102 receives instructions and data and processes the data according to the instructions. The memory 104 stores instructions and data for use by the CPU 102. The input/output bridge 106 provides communication between CPU 102, memory 104, non-volatile storage 110, input/output devices 108, and FPGA 120. Non-volatile storage 110 stores data and instructions when design computer system 101 is powered off. Input/output devices 108 include devices for interfacing with devices external to design computer system 101. As is generally known, an FPGA is a circuit with configurable logic blocks that can be configured to perform a desired function by enabling or disabling the different logic blocks.

Memory 104 stores a design module 112, a circuit model 114, and an FPGA configuration module 116. Design module 112 encompasses an application for providing functionality for designing circuit model 114. Thus, design module 112 may include tools that allow for design of various aspects of the circuit model 114. For example, design module 112 may allow specification of placement, connectivity, and various aspects of circuit modules within circuit model 114. FPGA configuration module 116 configures FPGA 120 based on circuit model 114, configuring the various configurable elements of the FPGA 120 in accordance with the design specified by circuit model 114.

Figure 1B:
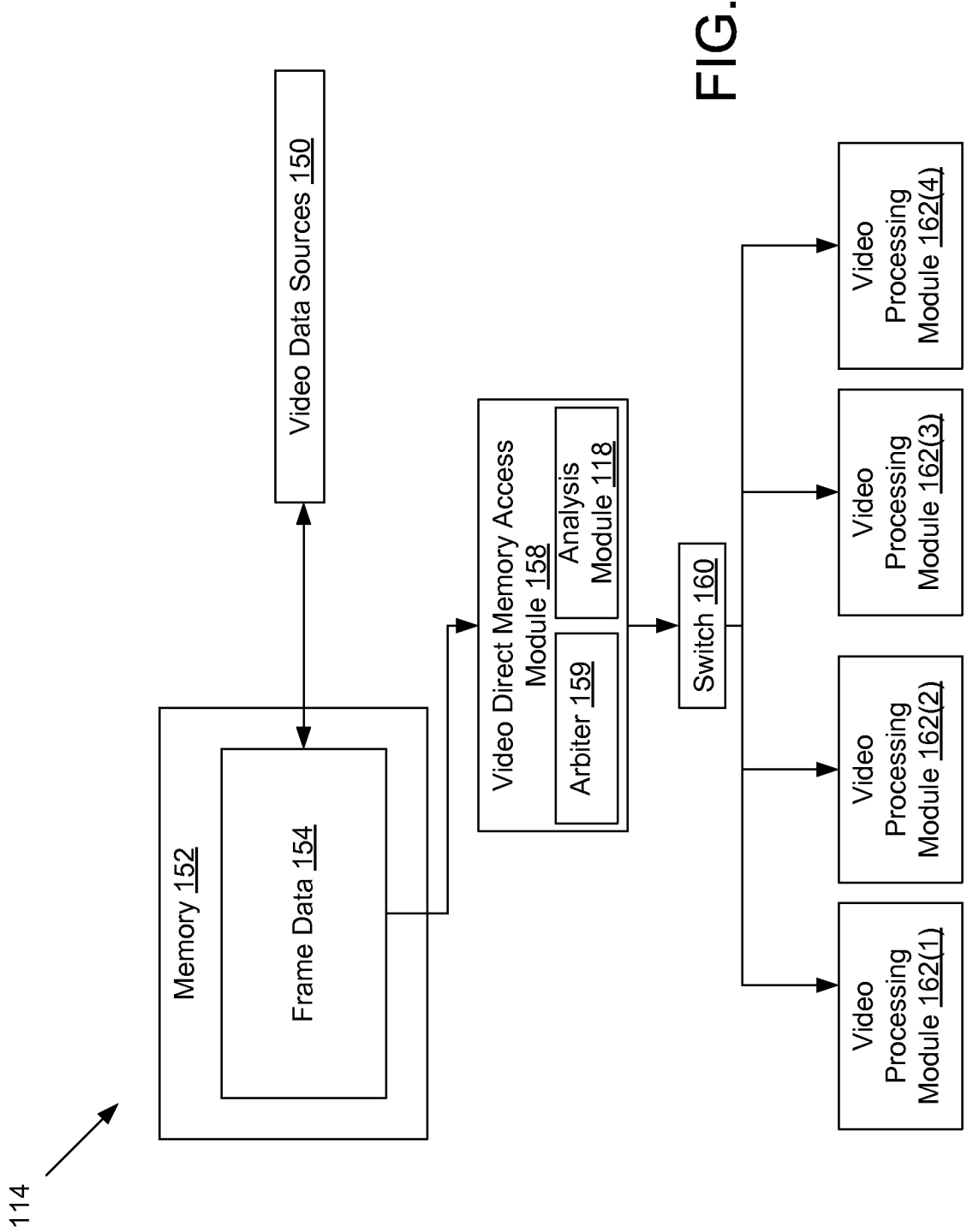
FIG. 1B is a block diagram of circuit model that is configured into FPGA by FPGA configuration module.

FIG. 1B is a block diagram of circuit model 114 that is configured into FPGA 120 by FPGA configuration module 116. As shown, circuit model 114 includes video data sources 150, a memory 152, a video direct memory access (VDMA) module 158, a switch 160, and video processing module 162. VDMA module 158 includes an arbiter 159 and an analysis module 118.

It should be understood that, while the subject matter illustrated in FIG. 1B is described herein as being a circuit model 114 to be configured into an FPGA 120, the teachings of the present disclosure are not so limited. For example, the various elements shown in FIG. 1B may be elements of a hard-wired circuit. Such a hard-wired circuit may be included within a system on a chip ("SoC") or in another hardware platform.

Video data sources 150 generally include modules that produce pixel data. Such video data sources 150 may include a central processing unit or microcontroller, a specialized graphics processing unit, test data generation modules, or other electronic modules that generate pixel data for writing into frame data 154, which is stored in memory 152. The frame data 154 stores pixel data for one or more frames of video output.

The connection between memory 152 and VDMA module 158, as well as the connection between VDMA module 158 and switch 160 may be an AXI compliant connection, where AXI is the "Advanced Extensible Interface" standard that is part of the AMBA ("Advance Microcontroller Bus Architecture") open standard developed by ARM Ltd. Switch 160 may be an AXI streaming switch.

As described above, a designer of a system represented as circuit model 114 may desire various video processing techniques to be applied to the pixel data stored in frame data 154 prior to being output to a display. In one example, an up-conversion technique is applied, wherein pixel data for a frame that is generated at a particular resolution is up-converted to a higher resolution. In another example, a mosaic technique is applied in which a final, high resolution video output is generated by "tiling" multiple lower-resolution video inputs. In other examples, frame rate conversion may be applied, frame multiplexing for three-dimensional display may be applied, or various other techniques may be applied.

To perform these techniques, video processing modules 162 are included within circuit model 114 by a designer. These video processing modules 162 may be thought of as "channels" of a video pipeline. In one example, the video processing modules 162 function as an up-scaling pipeline, performing the up-conversion technique described above. More specifically, the up-scaling pipeline accepts video at one resolution and up-converts that video to video at a second, higher resolution. Such a pipeline may include one or more video processing modules 162 performing deinterlacing functions, one or more other video processing modules 162 performing scaling functions, and one or more other video processing modules 162 performing on-screen display functions. Video processing modules 162 may also function as a mosaic display pipeline. Such a pipeline accepts multiple lower-resolution video streams as input and converts those inputs into a single "tiled" video output. The video processing modules 162 would include deinterlacing modules, scaling modules, and on-screen display modules. Another example pipeline is a broadcast multi-viewer pipeline. Such a pipeline would also include deinterlacers, scalers, on-screen displays, arranged in a particular manner.

To provide data to each of the video processing modules 162, a video direct memory access (VDMA) module 158, which includes an arbiter 159 and an analysis module 118, is provided. In general, VDMA module 158 sequentially reads pixel data associated with the different video processing modules 162 from frame data 154 in memory, interleaves the read data, and transmits the data to the switch 160. This interleaved data includes data targeted for different video processing modules 162. Switch 160 transmits the data to a particular video processing module 162 for processing.

Analysis module 118 performs analysis to "tune" VDMA module 158 for efficient video data arbitration to video processing modules 162. More specifically, analysis module 118 causes video traffic to flow between memory 152 and VDMA module 158 and between VDMA module 158 and video processing modules 162. Analysis module also measures certain characteristics of the flowing data, such as bandwidth characteristics, modifies various aspects of the data flow, and adjusts an arbitration schedule of arbiter 159 to cause VDMA module 158 to efficiently transfer data to video processing modules 162.

The analysis performed by analysis module 118 generally includes: measuring a maximum bandwidth between memory 152 and VMDA module 158, determining a burst length associated with this maximum bandwidth, measuring a bandwidth between VDMA module 158 and each video processing module 162, determining an arbitration schedule for arbiter 159, and configuring arbiter 159 according to the arbitration schedule.

To determine the maximum amount bandwidth between memory 152 and VDMA module 158, analysis module 118 programs VDMA module 158 in an "infinite sink mode." This infinite sink mode causes VDMA module 158 to continuously request data from memory 152. Analysis module 118 also programs VDMA module 158 to continuously request data from frame data 154 with a lowest allowable burst length. A burst length refers to an amount of data that is provided by memory 152 in response to a request for data at a particular address. The connection between VDMA module 158 and memory 152 may be associated with a range of possible burst lengths. Any of these burst lengths may be chosen for transmission between memory 152 and VDMA module 158.

After receiving data from memory 152 for a threshold amount of time, analysis module 118 determines a bandwidth associated with the chosen burst length based on this threshold amount of time and the amount of data transferred. At this point, analysis module 118 increases the burst length to the next allowable burst length and measures the bandwidth associated with that burst length. Analysis module 118 continues increasing the burst length and measuring the bandwidth associated with those burst lengths until the maximum allowable burst length is reached. Analysis module 118 identifies the maximum bandwidth associated with these different burst lengths. If two or more burst lengths are associated with an equivalent, maximum bandwidth, or with bandwidths that are within a threshold value of each other, then analysis module 118 identifies both the highest burst length and the lowest burst length associated with maximum bandwidth.

Once the maximum bandwidth is determined, the analysis module 118 uses the lowest burst length associated with the maximum bandwidth to determine bandwidth associated with each of the video processing modules 162. More specifically, analysis module 118 disables all video processing modules 162 except for a first video processing module 162(1) and issues read requests with the lowest burst length identified above for that video processing module 162(1) to read from VDMA module 158 for a threshold amount of time. After that threshold amount of time, analysis module 118 measures the amount of bandwidth associated with those data transfers. This bandwidth is generally related to the rate at which the particular video processing module 162(1) can read and/or process the data received. After measuring the bandwidth for one video processing module 162, analysis module 118 disables the measured video processing module 162(1) and enables another video processing module 162(2), measuring the bandwidth associated with that video processing module 162(2) in the same manner. Analysis module 118 measures the bandwidth associated with each video processing module 162 in this manner.

For each of the video processing modules 162, analysis module 118 obtains a number of cycles over which the data associated with the burst length that is used is processed by that video processing module 162. More specifically, this number of cycles represents the number of cycles that the video processing module 162 consumes in order to process data associated with one burst of data of the chosen burst length (that is, again, associated with the maximum bandwidth between memory 152 and VDMA module 158). For each video processing module 162, the relative numbers of cycles are used to assign a relative arbitration weight that is used by VDMA module 158 to arbitrate traffic from memory 152 to the different video processing modules 162.

To assign these weights, for each video processing module 162, analysis module 118 divides the determined number of cycles for a particular video processing module by the lowest number of cycles out of all video processing modules 162 to arrive at normalized cycle counts. The normalized cycle counts would constitute 1 for the lowest normalized cycle count, and greater numbers for normalized cycle counts that are not the lowest. For example, if the third video processing module 162(2) consumes 64 cycles to process data of the burst length, and that number is the lowest number of cycles, then the normalized cycle count for the third video processing module 162(2) would be 1. Then, if the fourth video processing module 162(4) consumes 128 cycles to process data of the burst length, then the normalized cycle count for the fourth video processing module 162(4) would be 2. Normalized cycle counts are assigned to the other video processing modules 162 in a similar manner.

After assigning normalized cycle counts, analysis module 118 assigns a normalized bandwidth value of 1 to the highest normalized cycle count, and assigns normalized bandwidth values to the other video processing modules 162 relative to the normalized bandwidth value of 1. More specifically, to arrive at a normalized bandwidth value for any particular video processing module 162, analysis module 118 divides the highest normalized cycle count by the normalized cycle count of the video processing module 162 for which the normalized bandwidth value is desired. The result of this operation is the normalized bandwidth value for that video processing module 162. Continuing with the example above, if the second video processing module 162(2) has a highest normalized cycle count of 4, then analysis module 118 would assign a normalized bandwidth of 1 to the second video processing module 162(2). Analysis module 118 would determine that the third video processing module 162(3), which has a normalized cycle count of 1, would get a normalized value of 4/1, by dividing the highest normalized cycle count of 4 by the normalized cycle count for the third video processing module 162(3) of 1 to arrive at 1. Analysis module 118 would also determine that the normalized bandwidth value of the fourth video processing module 162(4) would be 2, by dividing the maximum normalized cycle count of 4 by the normalized cycle count for the fourth video processing module 162(4) of 2, to arrive at a value of 2. Note that fractional normalized bandwidth values are possible.

With these normalized bandwidth values, the arbiter 159 in VDMA module 158 performs arbitration of the data received from memory 152. More specifically, arbiter 159 determines which video processing modules 162 to send data to based on an arbitration scheme. The arbitration scheme schedules video processing modules 162 on a schedule of arbitration cycles.

Within each arbitration cycle, arbiter 159 transmits data to one or more video processing modules 162 in one or more arbitration sub-cycles. For each arbitration sub-cycle, arbiter 159 performs a priority test operation for each video processing module 162 to determine whether arbiter 159 transmits data to that module in that particular sub-cycle.

At the beginning of each arbitration cycle, arbiter 159 determines a priority value for each video processing module 162. Arbiter 159 determines this priority value by adding the normalized bandwidth for a video processing module 162 to a "residual" bandwidth amount from previous arbitration cycles to arrive at a priority value. In a first arbitration cycle, the residual value is zero, but in other arbitration cycles, the residual value is related to an amount of "unused" bandwidth that remains after the video processing module 162 receives data in that arbitration cycle.

For each sub-cycle, the priority test operation includes the following. Arbiter 159 tests the priority value against a threshold value. The threshold value may be equal to the lowest normalized bandwidth value, which may be 1. If the priority value is greater than or equal to the threshold value, then the arbiter 159 issues data to the video processing module 162 in that arbitration sub-cycle and the priority value for that video processing module 162 is decremented by a decrement amount. The decrement amount may be equal to the lowest normalized bandwidth value, which may be 1. If the priority value is less than the threshold value, then the arbiter 159 does not issue data to the video processing module 162 in that arbitration sub-cycle and does not decrement the priority value for that video processing module 162.

The result of the above is that arbiter 159 determines which video processing modules 162 are to receive data for each particular sub-cycle. Based on this determination, arbiter 159 transmits data to all such processing modules 162 in that sub-cycle in a round-robin manner. Specifically, arbiter 159 transmits data in a particular order to these processing modules 162 in each sub-cycle. In each sub-cycle, the order may be the same—thus, the order is "round-robin." The duration of any particular sub-cycle is thus dependent on the number of video processing modules 162 to receive data in that particular sub-cycle.

Arbiter 159 may deviate from the round-robin in some situations. More specifically, if arbiter 159 detects that a processing module 162 is too busy to receive data in a particular cycle, then arbiter 159 may select a different processing module 162 to receive data in order to advance processing.

An arbitration cycle ends when no video processing modules 162 (or, as stated above, "channels") are to receive data. More specifically, when the largest priority value for all video processing modules 162 are below the threshold value, the arbitration cycle ends and a new arbitration cycle begins.

An example of this arbitration is now provided, with reference to Table 1.

| Channel Sub-Cycle | Normalized Bandwidth | Priority Values (Arbitration Cycle 1) | | | | Priority Values (Arbitration Cycle 2) | | | |
|---|---|---|---|---|---|---|---|---|---|
| | | 1 | 2 | 3 | 4 | 1 | 2 | 3 | 4 |
| 1 | 4 | 4 | 3 | 2 | 1 | 4 | 3 | 2 | 1 |
| 2 | 4 | 4 | 3 | 2 | 1 | 4 | 3 | 2 | 1 |
| 3 | 2 | 2 | 1 | 0 | 0 | 2 | 1 | 0 | 0 |
| 4 | 1 | 1 | 0 | 0 | 0 | 1 | 0 | 0 | 0 |

In the first arbitration cycle (arbitration cycle 1), and in the first sub-cycle, arbiter 159 calculates the priority value for each video processing module 162 as the sum of the residual bandwidth value and the normalized bandwidth for that sub-cycle. Because there is no residual bandwidth, the priority value for channel 162 1 is 4 (a normalized of bandwidth of 4+0). Similarly, the priority values for the second, third, and fourth channels 162 are 4, 2, and 1, respectively, based on the normalized bandwidth of those channels 162 as shown. In the first sub-cycle, because each channel 162 has a value that is greater than or equal to a threshold value, which is the lowest normalized bandwidth (1), arbiter 159 issues data to each channel 162. Also, the priority value for each of those channels 162, is decremented by the lowest normalized bandwidth. In the next sub-cycle, only channels 162 1, 2, and 3 have priority values greater than or equal to the threshold value (1), so only channels 162 1, 2, and 3, are issued data. In the third and fourth sub-cycles, only channels 1 and 2 have priority values greater than or equal to the threshold value, so only those channels 162 are issued data. Finally, the arbitration cycle ends after the fourth sub-cycle because after the fourth sub-cycle, no channel 162 has a priority value greater than or equal to the threshold value. The second arbitration cycle proceeds in a similar manner to the first arbitration cycle.

Another example is now provided to demonstrate the concept of residual bandwidth values, with reference to Table 2.

| Channel Sub-Cycle | Normalized Bandwidth | Priority Values (Arbitration Cycle 1) | | | | Priority Values (Arbitration Cycle 2) | | | |
|---|---|---|---|---|---|---|---|---|---|
| | | 1 | 2 | 3 | 4 | 1 | 2 | 3 | 4 |
| 1 | 4 | 4 | 3 | 2 | 1 | 4 | 3 | 2 | 1 |
| 2 | 2 | 2 | 1 | 0 | 0 | 2 | 1 | 0 | 0 |
| 3 | 1.5 | 1.5 | .5 | .5 | .5 | 2 | 1 | 0 | 0 |
| 4 | 1 | 1 | 0 | 0 | 0 | 1 | 0 | 0 | 0 |

In the first arbitration cycle, the channels 162 are assigned priority values of 4, 2, 1.5, and 1, based on the normalized bandwidth values of those channels 162. For the first sub-cycle, each channel 162 is issued data, and the respective priority values are decremented by the decrement value—1. For the second sub-cycle, channels 162 2 and 3 are issued data, but channels 162 3 and 4 are not, since the priority values of channels 162 3 and 4 are lower than the threshold value of 1. In the third and fourth sub-cycles, only the first channel 162 is issued data, as only the priority value related to the first channel 162 is greater than or equal to the threshold value. The second arbitration cycle is similar to the first arbitration cycle except that the initial priority value for channel 162 3 is 2, rather than 1.5, because there is a residual bandwidth of 0.5 from arbitration cycle 1. Thus, while in arbitration cycle 1, channel 162 3 does not receive data in the second sub-cycle, in arbitration cycle 2, channel 162 3 does receive data in the second sub-cycle.

Figure 2:
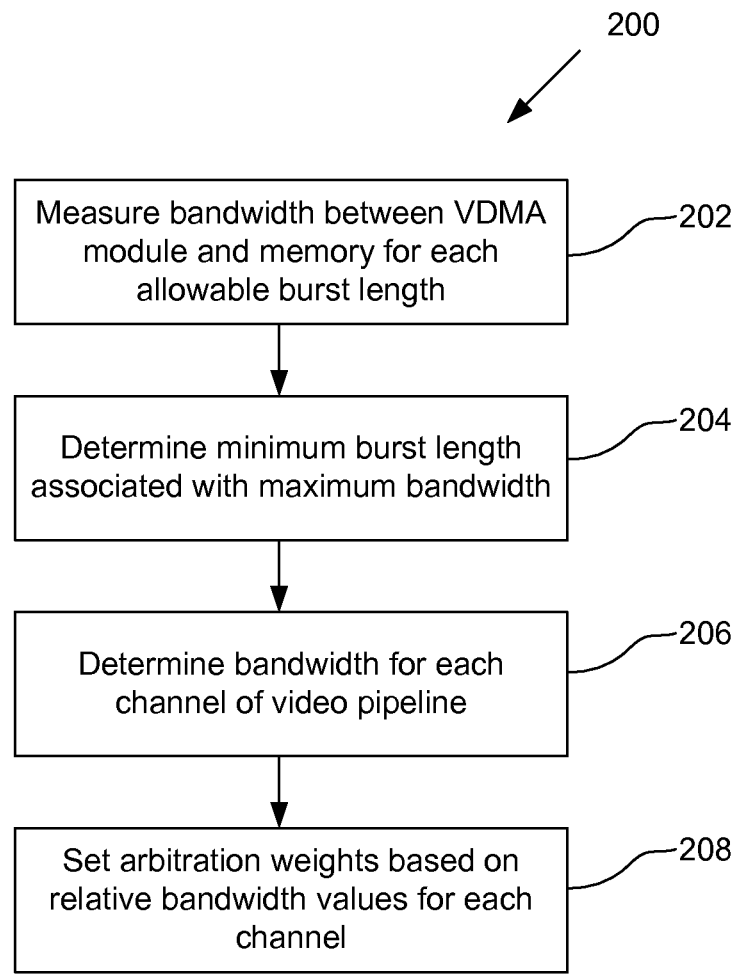
FIG. 2 is a flow diagram of method steps for determining arbitration weights for video processing channels coupled to video direct memory access module, according to an example.

FIG. 2 is a flow diagram of method steps for determining arbitration weights for video processing channels coupled to video direct memory access module 158, according to an example. Although the method 200 is described with respect to the systems of FIGS. 1A and 1B, those of skill in the art will recognize that any system configured to perform the method steps in various alternative orders are within the scope of the present disclosure.

As shown, the method 200 begins at step 202 at which VDMA module 158 measures the bandwidth between VDMA module 158 and memory 104 that provides video data to VDMA module 158 for each allowable burst length. Specifically, VDMA module 158 continuously reads data from memory 158 and after a certain amount of time, measures an amount of data that has been read to arrive at a bandwidth. At step 204, VDMA module 158 determines a minimum burst length that is associated with a maximum bandwidth. Specifically, VDMA module 158 examines the bandwidths and associated burst lengths determined in step 202 and chooses the burst length associated with the highest bandwidth. At step 206, VDMA module 158 determines a bandwidth for each channel of a video pipeline, using the chosen burst length associated with the highest bandwidth. More specifically, VDMA module 158 reads from memory 158 with the burst length and transmits to each channel independently in order to determine how much bandwidth each channel can support. At step 208, after determining the bandwidths associated with each channel, VDMA module 158 sets arbitration weights based on relative bandwidth values for each channel. The arbitration weights are set by first normalizing the bandwidth values by setting the normalized bandwidth value for the lowest bandwidth to 1 and by setting the other normalized bandwidth values to the respective bandwidth divided by the lowest bandwidth.

Figure 3:
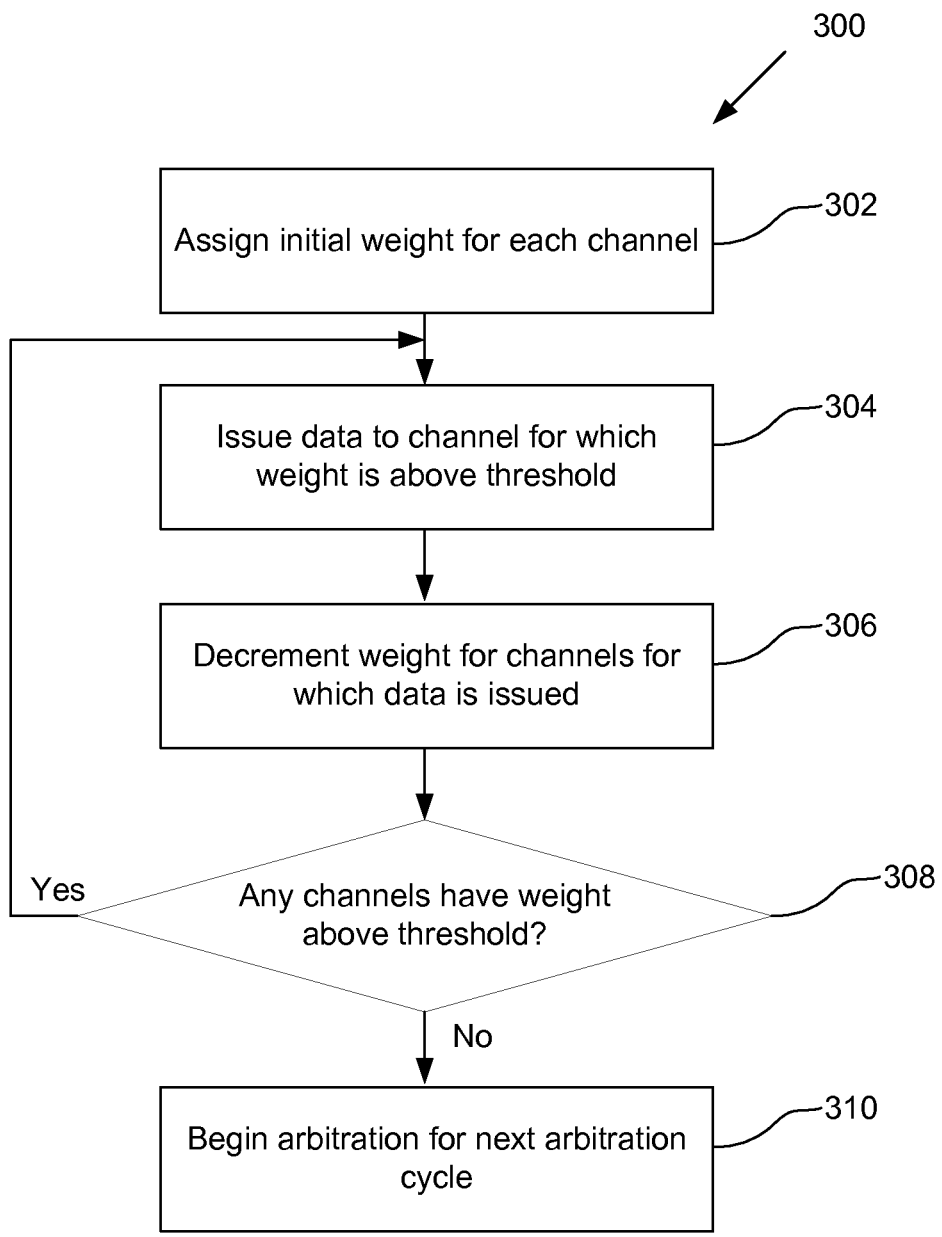
FIG. 3 is a flow diagram of method steps for arbitrating data between different video pipeline channels, according to an example.

FIG. 3 is a flow diagram of method steps for arbitrating data between different video pipeline channels, according to an example. Although the method 300 is described with respect to the systems of FIGS. 1A and 1B, those of skill in the art will recognize that any system configured to perform the method steps in various alternative orders are within the scope of the present disclosure.

As shown, the method 300 begins at step 302, at which arbiter 159 assigns initial weights for each channel. The initial weights are assigned by adding the normalized bandwidth for a particular channel to residual bandwidths from prior arbitration cycles, if any. At step 304, arbiter 159 issues data to each channel for which the weight is above a threshold value. At step 306, arbiter 159 decrements the weight for each channel for which data was issued. At step 308, arbiter 159 checks to determine whether any channels have a weight above the threshold value. If no channels have weight above the threshold value, then the method returns to step 304 to process subsequent sub-cycles. If at least one channel has a weight above the threshold value, then the method proceeds to step 310. At step 310, arbiter 159 begins arbitration for a subsequent arbitration cycle.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific example implementations, other and further example implementations may be devised without departing from the basic scope thereof, and the scope thereof is determined by the claims that follow.

What is claimed is:

1. A method for arbitrating data for channels in a video pipeline, the method comprising:
   determining arbitration weights for the channels;
   determining which channels have arbitration weights above a threshold;
   issuing data to the channels with arbitration weights above the threshold during an arbitration cycle;
   decrementing arbitration weights for channels for which data is issued during the arbitration cycle using a lowest one of normalized bandwidth values assigned to the channels; and
   repeating the determining, issuing, and decrementing until no channels have arbitration weights above the threshold.

2. The method of claim 1, wherein determining the arbitration weights comprises determining a burst length that is associated with a greatest bandwidth between a memory and a video direct memory access module (VDMA module) coupled to the channels.

3. The method of claim 2, wherein determining the arbitration weights further comprises determining bandwidth characteristics for the channels by transmitting data from the VDMA module to the channels based on the burst length.

4. The method of claim 3, wherein determining the arbitration weights further comprises determining the arbitration weights based on the bandwidth characteristics for the channels.

5. The method of claim 1, wherein issuing data to the channels comprises issuing data in a round-robin order.

6. The method of claim 1, wherein issuing data to the channels comprises:
   issuing data to the channels with a burst length that is associated with a greatest bandwidth between a memory and a video direct memory access module (VDMA module) coupled to the channels.

7. The method of claim 1, wherein determining the arbitration weights comprises:
   adding a normalized bandwidth to a residual bandwidth value.

8. The method of claim 7, wherein:
   the residual bandwidth value comprises a value remaining from a previous arbitration cycle.

9. The method of claim 1, wherein the normalized bandwidth values are derived from dividing a highest normalized bandwidth cycle count associated with the channels by a normalized cycle count for one of the channels.

10. The method of claim 9, wherein the normalized cycle count is based on a number of cycles used by a video processing module associated with one of the channels to process data associated with one burst of data of a chosen burst length.

11. A computing device for arbitrating data for a plurality of channels in a video pipeline, the computing device comprising:
  a video pipeline comprising a plurality of channels; and
  a video direct memory access (VDMA) module coupled to the channels through a switch, the VDMA module comprising:
  an analysis module configured to:
    determine arbitration weights for the channels, and
  an arbiter configured to:
    determine which channels have arbitration weights above a threshold;
    issue data to the channels with arbitration weights above the threshold during the arbitration cycle;
    decrement arbitration weights for channels for which data is issued during the arbitration cycle using a lowest one of normalized bandwidth values assigned to the channels; and
    repeat the determining, issuing, and decrementing until no channels have arbitration weights above the threshold.

12. The computing device of claim 11, wherein the analysis module is configured to determining the arbitration weights by:
  determining a burst length that is associated with a greatest bandwidth between a memory and the VDMA module coupled to the channels.

13. The computing device of claim 12, wherein the analysis module is further configured to determine the arbitration weights by:
  determining bandwidth characteristics for the channels by transmitting data from the VDMA module to the channels based on the burst length.

14. The computing device of claim 13, wherein the analysis module is further configured to determine the arbitration weights by:
  determining the arbitration weights based on the bandwidth characteristics for the channels.

15. The computing device of claim 11, wherein the arbiter is configured to issue data to the channels by:
  issuing data in a round-robin order.

16. The computing device of claim 11, wherein the arbiter is configured to issue data to the channels by:
  issuing data to the channels with a burst length that is associated with a greatest bandwidth between a memory and the VDMA module.

17. The computing device of claim 11, wherein the analysis module is configured to determine the arbitration weights by:
  adding a normalized bandwidth to a residual bandwidth value.

18. The computing device of claim 17, wherein:
  the residual bandwidth value comprises a value remaining from a previous arbitration cycle.

19. The computing device of claim 11, wherein:
  one or more of the switch and a connection between the VDMA module and the switch are compliant with Advanced Extensible Interface (AXI).

20. A non-transitory computer-readable medium storing instructions that, when executed by a processor, cause the processor to perform a method for arbitrating data for channels in a video pipeline, the method comprising:
  determining arbitration weights for the channels;
  determining which channels have arbitration weights above a threshold during a arbitration cycle;
  issuing data to the channels with arbitration weights above the threshold;
  decrementing arbitration weights for channels for which data is issued during the arbitration cycle using a lowest one of normalized bandwidth values assigned to the channels; and
  repeating the determining, issuing, and decrementing until no channels have arbitration weights above the threshold.

* * * * *